Feb. 6, 1940.  W. T. MARTIN  2,189,347
MACHINE FOR FORMING PACKAGES
Filed April 8, 1937   8 Sheets-Sheet 1
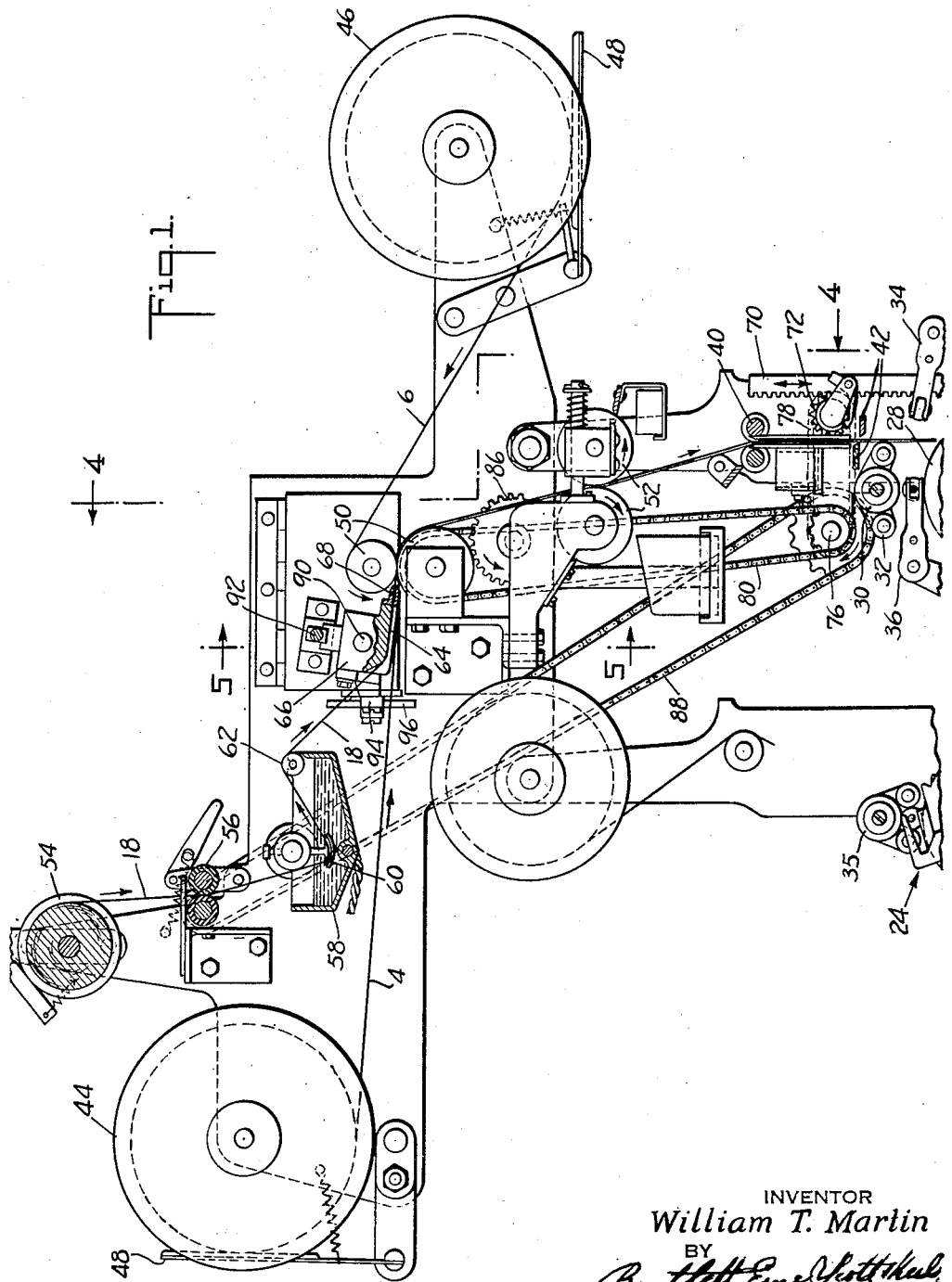
INVENTOR
*William T. Martin*
BY
ATTORNEYS Feb. 6, 1940. W. T. MARTIN 2,189,347
MACHINE FOR FORMING PACKAGES
Filed April 8, 1937 8 Sheets-Sheet 2
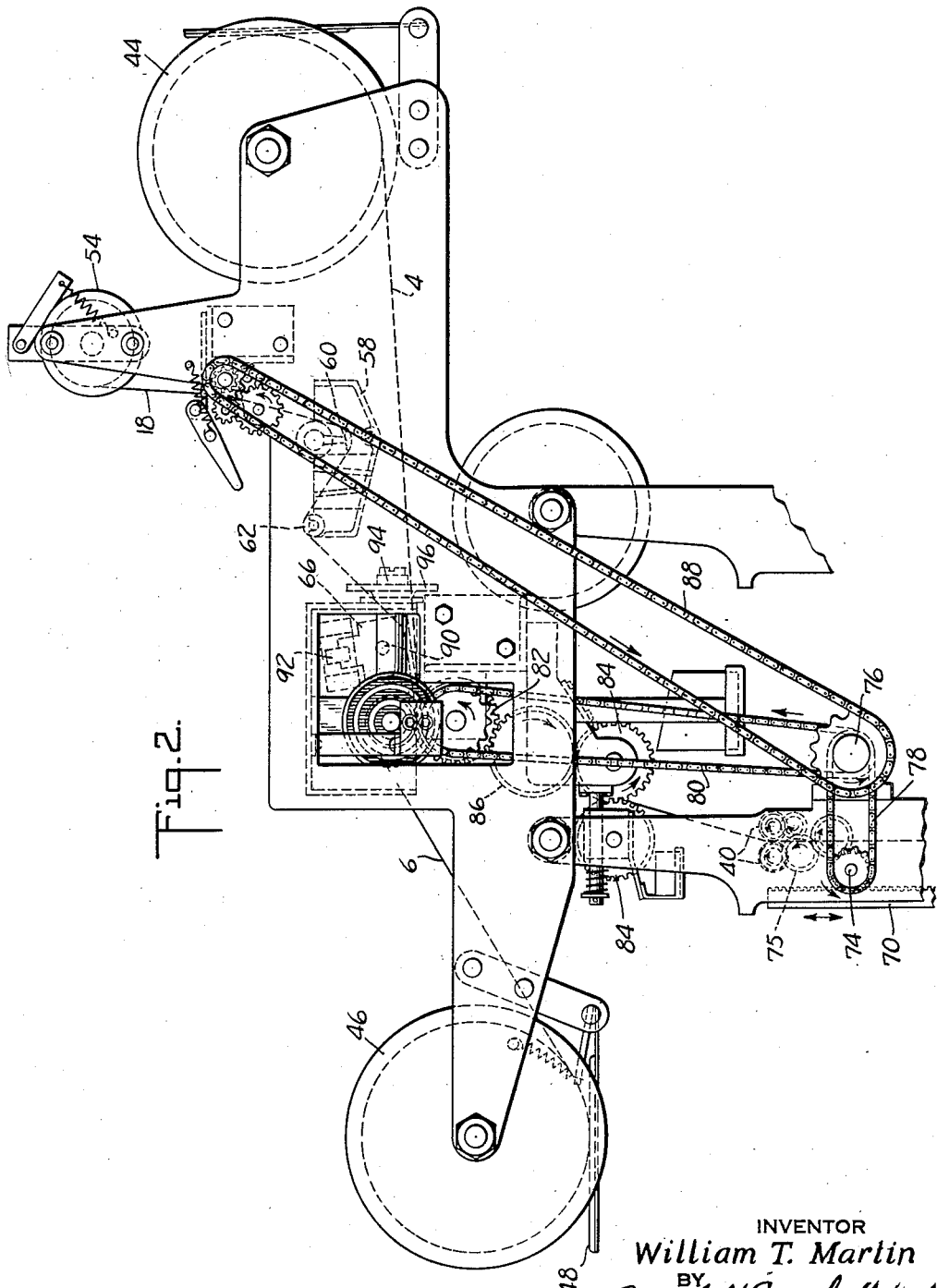
INVENTOR
William T. Martin
BY
Bartlett Eyre Scott Keel
ATTORNEYS

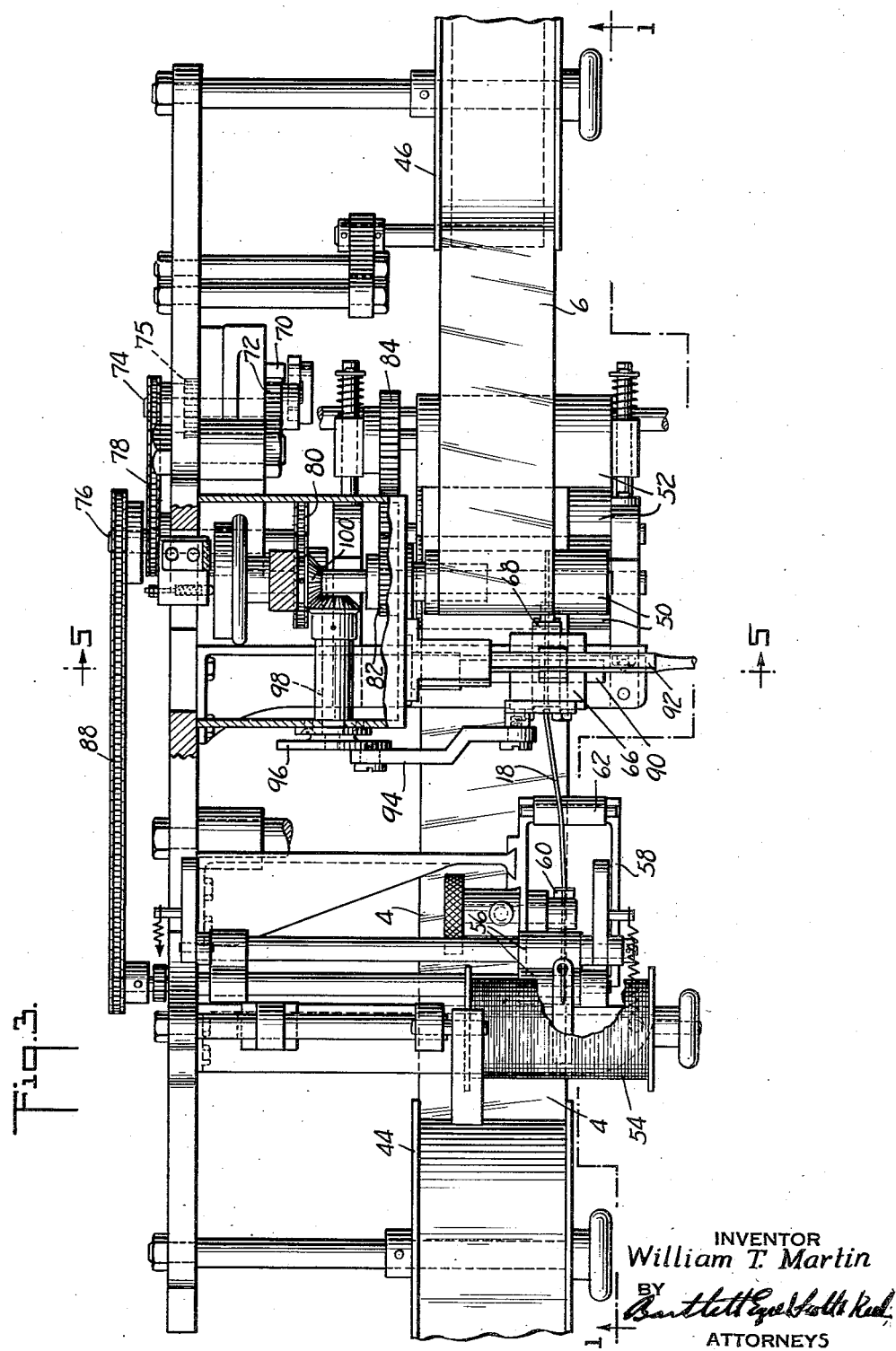

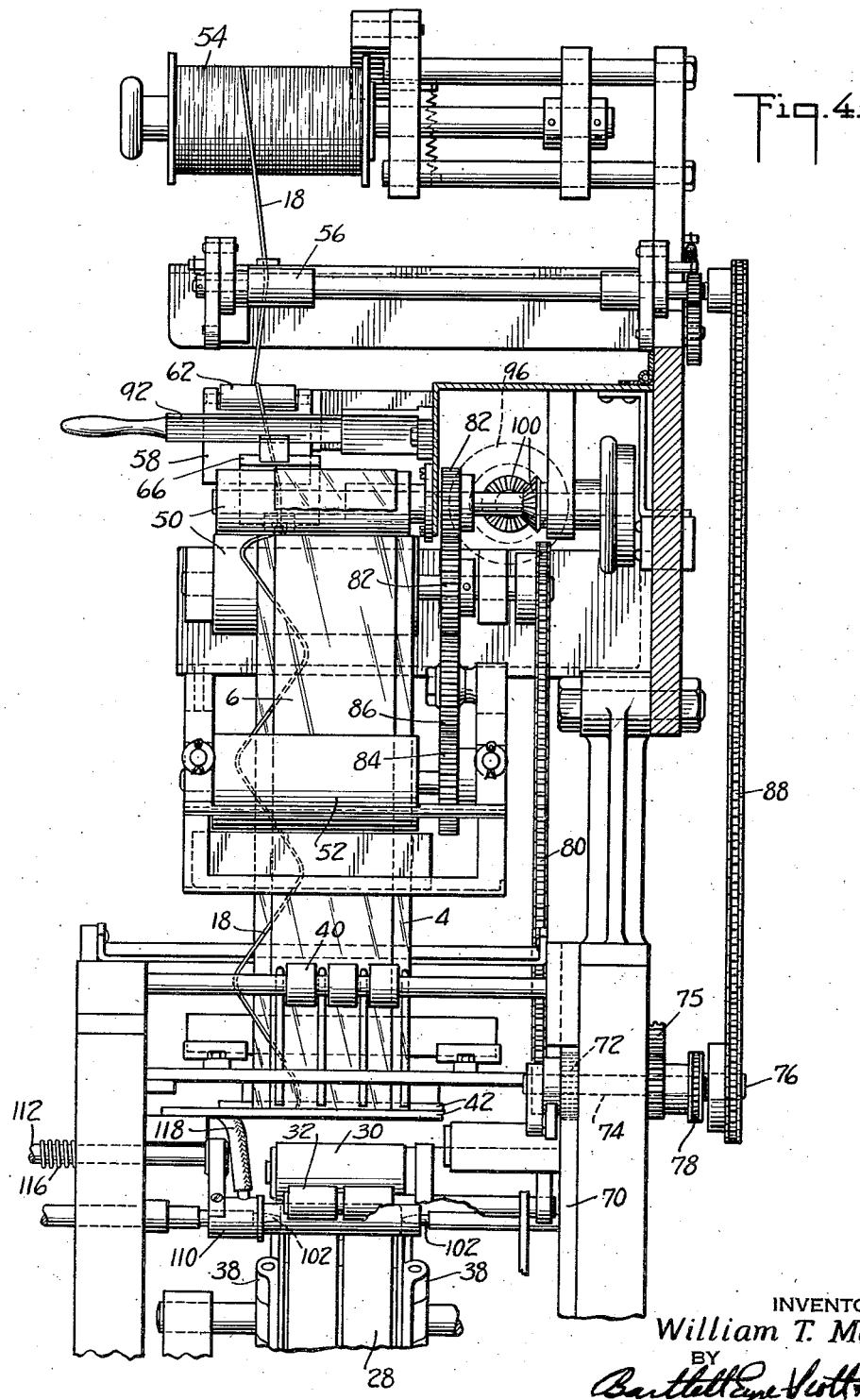

Feb. 6, 1940.  W. T. MARTIN  2,189,347
MACHINE FOR FORMING PACKAGES
Filed April 8, 1937  8 Sheets-Sheet 5
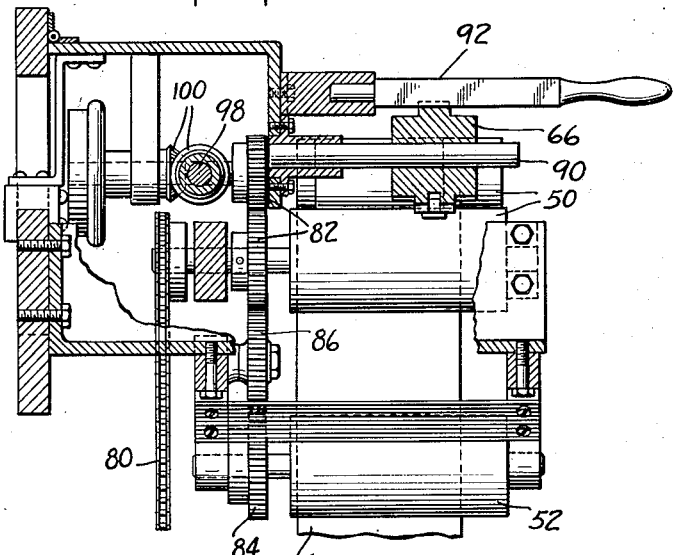
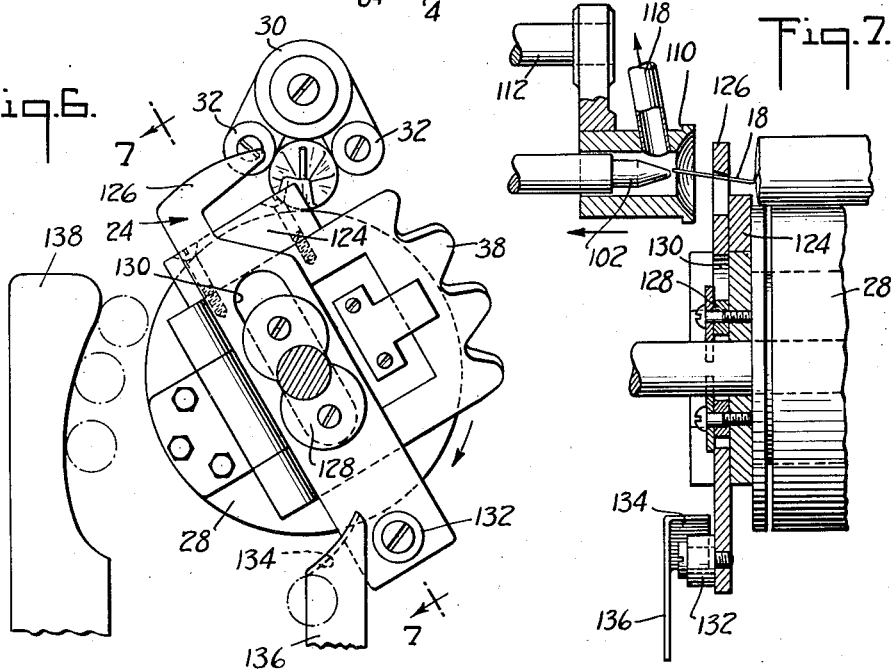
INVENTOR
William T. Martin
BY
ATTORNEYS Feb. 6, 1940.  W. T. MARTIN  2,189,347
MACHINE FOR FORMING PACKAGES
Filed April 8, 1937  8 Sheets-Sheet 6
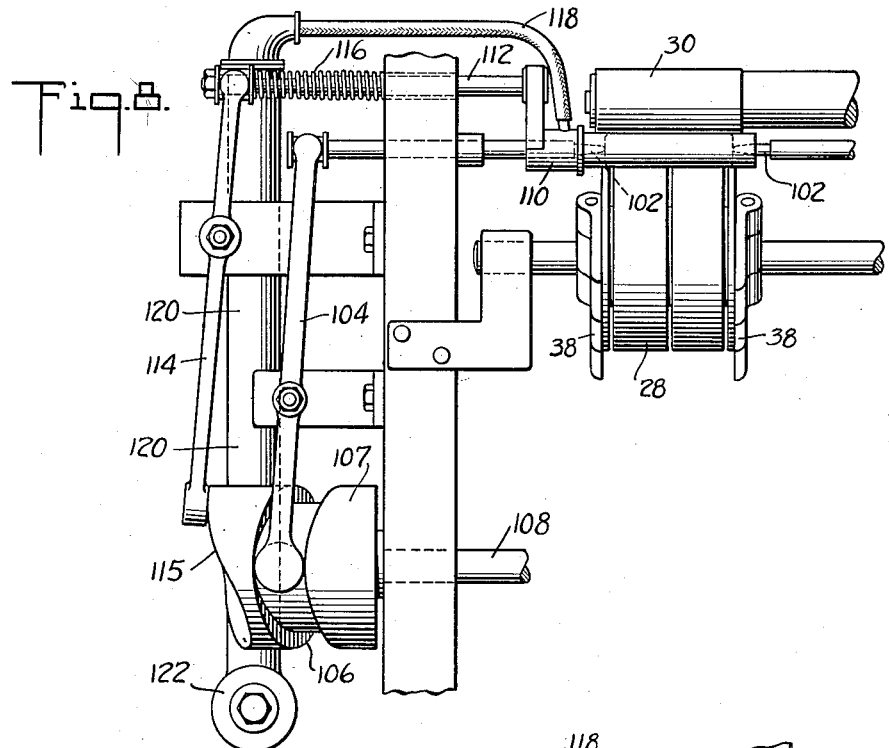
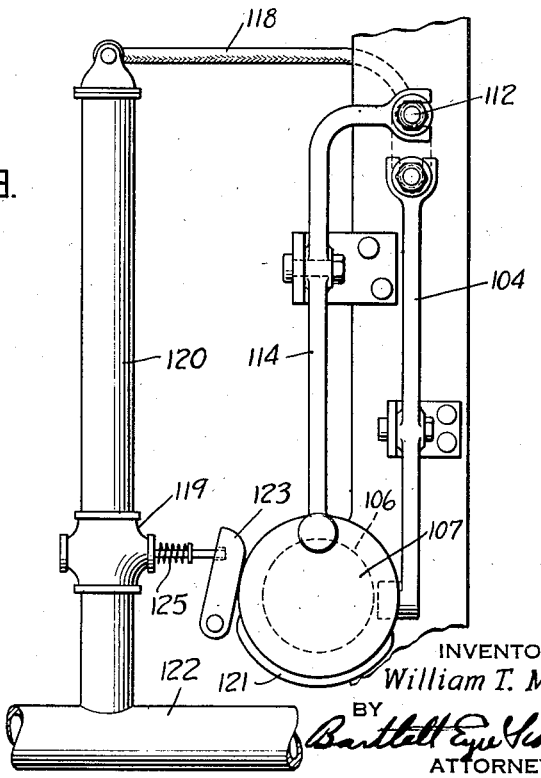
INVENTOR
William T. Martin
BY
Bartlett Eyre Keel
ATTORNEYS

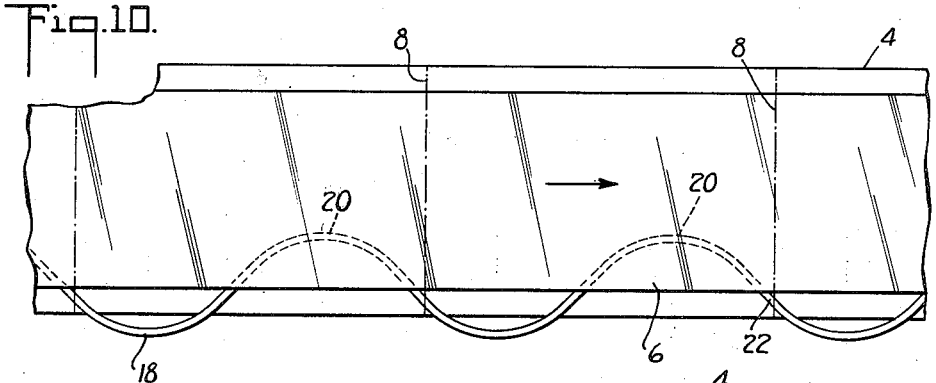
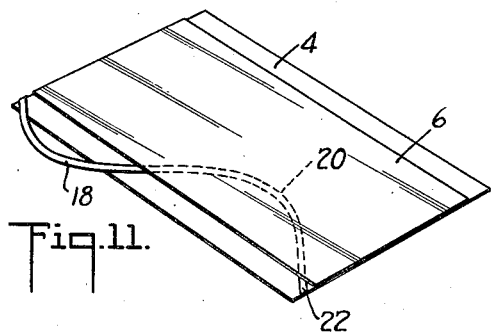
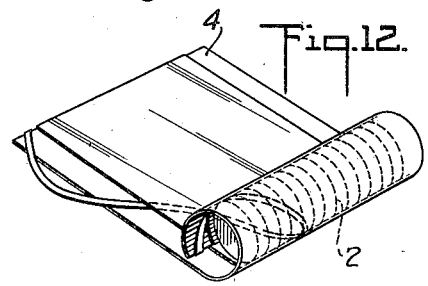
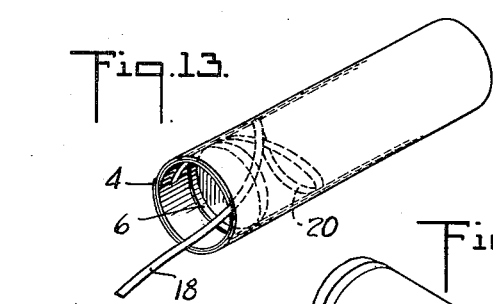
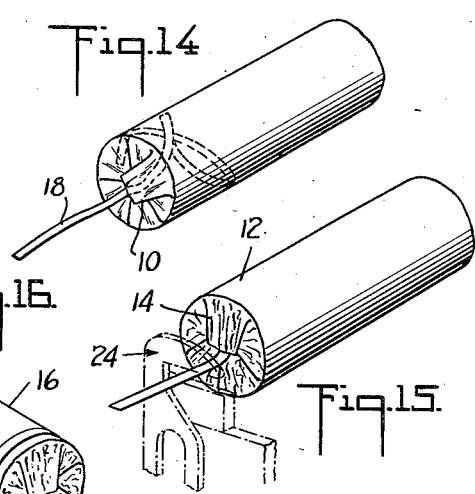
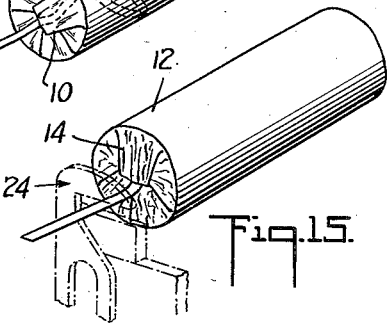
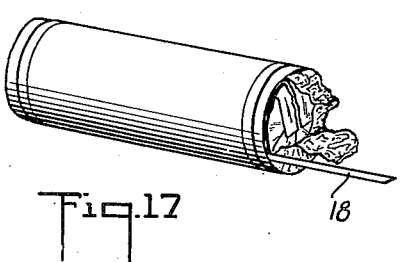
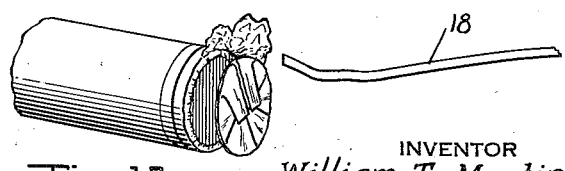

Feb. 6, 1940. W. T. MARTIN 2,189,347
MACHINE FOR FORMING PACKAGES
Filed April 8, 1937 8 Sheets-Sheet 8
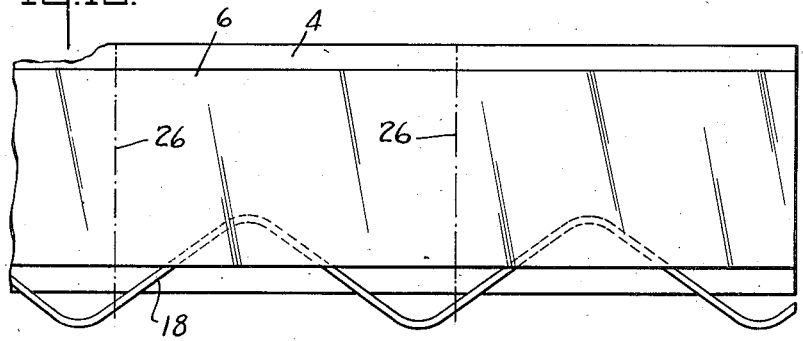
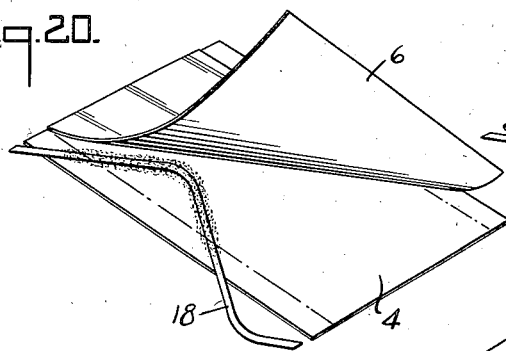
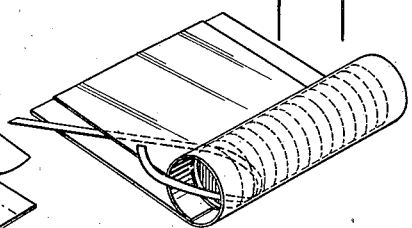
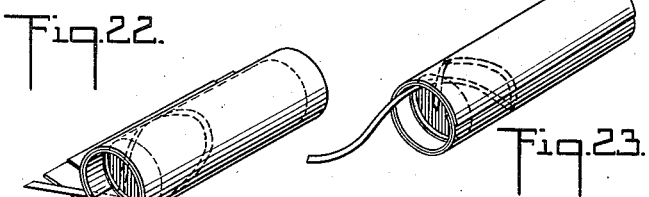
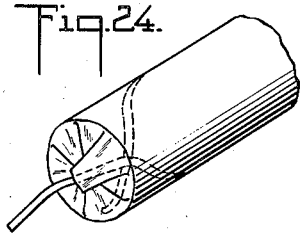
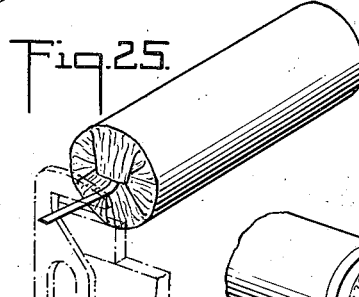
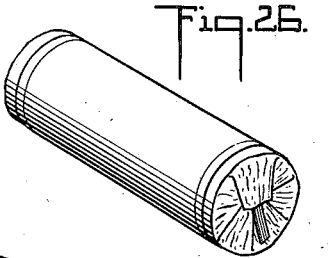
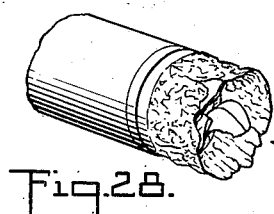
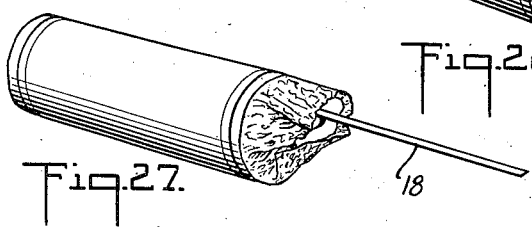
INVENTOR
William T. Martin
BY
ATTORNEYS Patented Feb. 6, 1940

2,189,347

UNITED STATES PATENT OFFICE 2,189,347

MACHINE FOR FORMING PACKAGES

William T. Martin, Canajoharie, N. Y., assignor to Beech-Nut Packing Company, Canajoharie, N. Y., a corporation of New York Application April 8, 1937, Serial No. 135,655

8 Claims. (Cl. 93—2)

The present invention relates to machines for forming packages, especially packages of hard or cooked candies in which the candies are arranged in stacks or rolls.

Rolls of hard or cooked candies are commonly wrapped first with a waxed paper wrapper which is wound around the periphery of the roll and its ends tucked in over the ends of the roll and then similarly wrapped with a sheet of foil, the foil enclosing the waxed paper. Heat is then applied to the tucked in ends and peripheral surface of the foil wrapper so as to partially melt the wax of the waxed paper wrapper which when allowed to cool tightly seals the longitudinal seam and the end tucks of the wrappers. Owing to such heat-sealing of the wrappers it is difficult to open the package which is usually done by attempting to open up the tucks of the two wrappers at one end of the package with the fingers.

The principal object of the present invention is to provide a novel and improved machine for forming packages that are provided with means for easily opening the packages.

The several features of the invention whereby the above and other objects may be attained, will be readily understood from the following description and accompanying drawings, in which:

Figure 1 is a longitudinal sectional elevation of the left hand side of the machine, the section being taken substantially on the line 1—1 of Fig. 3;

Fig. 2 is an elevation of the right hand side of the machine;

Figs. 3 and 4 are respectively plan and front views of the machine with certain parts broken away and parts in section;

Fig. 5 is a sectional elevation taken substantially on the line 5—5 of Figs. 1 and 3;

Fig. 6 is a detail sectional elevation, partly in section, of a portion of the wrapping mechanism of the machine;

Fig. 7 is a sectional elevation taken substantially on the line 7—7 of Fig. 6;

Fig. 8 is a detail front view of a portion of the wrapping mechanism;

Fig. 9 is a side view of the same;

Fig. 10 is a plan view of a portion of a composite paper strip of wrapping material and tearing ribbon previously to being cut to form the individual wrappers;

Fig. 11 is a view in perspective of one of the individual wrappers when cut from said strip;

Fig. 12 shows the wrapper partially wound around the peripheral surface of a roll of candies;

Fig. 13 is a view in perspective showing said wrapping material completely wrapped about the peripheral surface of the candy roll;

Fig. 14 is a similar view of the end portion of a roll with the end of the waxed paper wrapper tucked in over the end of the roll;

Fig. 15 is a similar view showing the package completely wrapped in foil and with devices about to cut off a projecting portion of the tearing ribbon of the package;

Fig. 16 is a view in perspective of the package when completely wrapped;

Fig. 17 is a similar view with the tearing strip partially pulled out so as to partially open one end of the package;

Fig. 18 is a similar view with the tearing strip completely pulled out and the end of the package open;

Figs. 19 through 28 are of a modified form, said figures substantially corresponding respectively to Figs. 10 through 18.

The packages, method and machine illustrated in the drawings are of the type of the package, method and machine described and claimed in the patents to Grant and Hambrecht, Nos. 2,043,829 and 2,043,830, both dated June 9, 1936.

In wrapping a stack or roll of articles 2 (Fig. 12) such as hard candies that are in the form of circular disks, a strip of waxed paper 4 and a strip of unwaxed paper or glassine 6 are placed one above the other, the glassine being narrower and spaced equal distances from the longitudinal edges of the waxed strip 4. The composite strip thus provided is cut on lines 8 to form the individual wrappers as illustrated in Fig. 12. This composite wrapper is initially applied to the candy roll by wrapping it about the peripheral surface of the roll with the unwaxed paper on the inside as illustrated in Figs. 12 and 13. When the composite wrapper is thus applied the glassine lining extends slightly beyond the ends of the candy roll and the waxed paper extends a distance beyond the lining. Thereafter the ends of the two wrappers are tucked in over the ends of the roll, the tucks 10 of the waxed paper wrapper being radially arranged in overlapping relation.

The package with the paper wrapping applied is then similarly wrapped in foil 12, the end tucks 14 of the foil wrapper being arranged similarly to the paper tucks 10. Thereafter heat is applied to the tucked in ends and peripheral surface of the foil wrapper so as to partially melt the wax of the waxed paper wrapper and seal the package, the radial end tucks of the paper wrapper being firmly secured together. After this heat-sealing operation a label 16 is applied about the peripheral surface of the foil wrapper with its ends spaced a distance from the ends of the package. The method of wrapping thus described is similar to that illustrated and described in said Grant et al. Patent No. 2,043,829.

In accordance with the present invention, as the paper strips 4 and 6 are brought together, a tearing strip 18 is laid between the two paper strips. This tearing strip may be of textile material and in the form of a narrow ribbon. The tearing ribbon is applied in a sinuous line as illustrated in Fig. 10, it being alternately curved in opposite directions. Preferably melted wax is applied to the tearing strip 18 previously to it being positioned between the paper strips and the two paper strips are heated to melt the wax of the waxed paper, and are firmly pressed together so as to secure the tearing ribbon 18 between them when the gax becomes cool. The tearing ribbon 18 is cut off upon cutting the paper strips 4 and 6 upon the lines 8 to form the individual wrappers. The tearing ribbon is applied and cut off in such a manner that in the individual wrappers the inner grooved portion 20 of the tearing ribbon extends in an arc from substantially one of the inner corners 22 of the glassine lining to substantially the center of the wrapper, with the remaining portion of the tearing strip projecting out from beneath the unwaxed paper with its end portion projecting beyond the waxed paper as shown.

In wrapping the composite paper wrapper about the roll of candies, when the wrapper has been wrapped substantially once around the roll as illustrated in Fig. 12, the inner end portion of the tearing ribbon is crossed by the outer portion of the ribbon, and during the balance of the winding of the wrappers about the roll the outer end of the ribbon is held outwardly so that when the wrapper is completely wrapped about the roll the outer end of the ribbon will project from the open end.

During the tucking in of the ends of the wrapper, the outer end of the tearing ribbon is continued to be held outwardly from the package. At the completion of the tucking operation, the outer end of the tearing ribbon projects outwardly from between the two plies of the last tuck to be formed.

The outer end of the tearing ribbon is also held outwardly during the wrapping of the package in foil, and at the completion of the tucking in of the ends of the foil, the end of the tearing strip projects outwardly from beneath the end of the last tuck that is formed. The excess amount of the ribbon is then cut off by means of cutting knives 24.

With the tearing strip thus applied, upon pulling outwardly on the outer end of the ribbon, the outer ply of the outermost tuck of the ribbon end of the package is first torn down to the periphery of said end. Then upon continued pulling on the tearing ribbon, the ribbon tears the wrappers, both the foil and paper wrapper, about said edge of said end as illustrated in Figs. 17 and 18 so as to completely sever off this end of the wrapper exposing the endmost candies.

During this tearing operation, the looped arrangement of the tearing ribbon about the peripheral surface of the package and the fact that it is secured by the wax of the wrappers, causes the ribbon to naturally tear around the edge of the package and this may be done without opening up the wax sealed tucks.

Instead of pulling straight out from the end of the package, if the tearing ribbon is pulled downwardly it may be caused to follow its loop arrangement around the package, thus causing several candies to be exposed to view.

In the package and method illustrated in Figs. 19 to 28, inclusive, the tearing ribbon may be applied to the two strips similarly to that above described as shown in Fig. 19. In cutting the composite strip to form the individual packages, the strips are cut on lines 26 which causes the inner end portion of the tearing ribbon to project from the wrappers a greater distance than the outer end portion.

When the paper wrapping is applied to the peripheral surface of the candy roll, instead of the outer end of the tearing ribbon projecting from the end of the package, the inner end projects from the end of the package, the inner end portion of the ribbon extending across the underside of the outer end portion. Upon pulling on the end of the ribbon as thus applied, the end tucks are successively opened up as the strip travels about the package. In this form the end tucks may be opened up without substantial tearing of the wrapping.

Where no glassine lining is employed, the tearing ribbon may be secured to the waxed paper wrapper alone.

The machine illustrated in the drawings for forming my improved package is provided with lower and upper wrapping rolls 28 and 30, respectively, arranged horizontally in the same vertical plane for receiving the article to be wrapped between them (Figs. 1, 4 and 6). Retaining rolls 32 engage opposite sides of the article to assist in retaining the article between the wrapping rolls during the wrapping operation. The article is initially positioned between the wrapping rolls by means of a conveying device 34, and the paper wrapped article is adapted to be removed from between the rolls and conveyed to foil wrapping mechanism 35 by means of a conveying device 36. The wrapping rolls 28, 30 and 32 serve to wind the paper wrapper about the article, the ends of the wrapper projecting beyond the ends of the article as illustrated in Figs. 12 and 13.

Tucking members 38 are arranged adjacent the ends of the lower wrapping roll 28, which tuck in the projecting ends of the wrapper over the ends of the article after the wrapper has been wound about the article.

The wrapping strips 4 and 6 from which the individual wrappers are formed are fed downwardly by means of feed rolls 40 between cutting off knives 42. As each candy roll is conveyed to the wrapping rolls it engages the portion of the wrapper that projects below the knives 42 and carries the same therewith to a position between the rolls. The knives then cut off a length of the wrapping material, and the wrapping rolls and associated parts operate to wrap the wrapper about the article, the wrapping material during this time being fed downwardly by the rolls 40 to present a length thereof to the next article to be wrapped. At the completion of the wrapping of each article with paper, the wrapped article may be delivered by the conveying device 36 to the wrapping mechanism 35 for placing the foil wrapper thereon. The foil wrapping mechansm may be and preferably is the same as the mechanism for wrapping the article in paper, this mechanism being preferably the same as that described and claimed in the patent to Harry E. Townsend, No. 1,796,773, dated March 17, 1931.

The waxed paper 4 and the unwaxed paper 6 are drawn from supply rolls 44 and 46, repectively, mounted on the machine frame, and each frictionally held from overrunning by a suitable frictional device 48, the two strips passing from the supply rolls to the feed rolls 40 through means hereinafter described.

In accordance with the present invention the two strips 4 and 6 pass from their respective supply rolls between two rolls 50, the strip 6 passing up over the upper roll 50. This upper roll 50 is heated so as to partially melt the wax on the upper side of the waxed paper. The strip then passes between two squeeze rolls 52 and thence to the feed rolls 40.

The tearing strip or ribbon 18 is drawn from a supply roll 54 and passes downwardly between feed rolls 56, thence through melted paraffin in a tank 58, the ribbon passing beneath a guide 60 submerged in the paraffin. From the paraffin the ribbon passes over an idler 62, and thence through a guide groove 64 in the underside of a block 66, and through a guide nozzle 68 on the forward end of the block which delivers the ribbon between the paper strips 4 and 6 adjacent the bite of the rolls 50. As the ribbon is fed beneath the guide block 66, the block is reciprocated transversely of the paper strip so as to cause the ribbon to be laid in a sinous path as illustrated in Fig. 10.

The heating rolls 50 cause the wax on the waxed paper wrapper to be melted slightly, and the two rolls firmly press the two papers together against the wax coated ribbon. The squeeze rolls 52 insure firm contact between the two paper strips and the ribbon, so that when the material reaches the wrapping devices the two strips are secured together and the ribbon is firmly held in position between them.

The various strip and ribbon feeding devices are intermittently driven by means of a vertically reciprocating rack bar 70 which operatively engages the teeth of a pinion 72 that is connected through a ratchet pawl with a shaft 74 on which a pinion is mounted, so that upon downward movement of the rack bar 70 the shaft 74 drives the feed rolls 40 through suitable gearing 75. This mechanism for driving the feed rolls 40 may be and preferably is the same as that illustrated and described in said patent to Townsend No. 1,796,773.

In the illustrated machine, the strip and ribbon feeding devices are operated from a shaft 76 which is driven by the oscillating shaft 74 through a chain 78 that passes over sprocket wheels on the two shafts (Fig. 2).

The heating rolls 50 are driven by a chain 80 which passes over sprocket wheels on the shaft 76 and on the shaft that carries the lower roll 50, the two heating rolls being connected by intermeshing gears 82.

The squeeze rolls 52 are driven through intermeshing gears 84 one of which is driven through an idler 86 that is operatively engaged by the gear 82 on the lower roll 50.

The feed rolls 56 for the tearing ribbon are driven by a sprocket chain 88 which passes over a sprocket wheel on the shaft 76 and a sprocket wheel on the shaft that carries the upper roll 56, the two rolls 56 having intermeshing gears.

The traverse guide block 66 for the tearing ribbon is mounted to slide on a fixed rod 90, and is held from turning movement on the rod by means of a guide arm 92 that engages in a groove in the block 66 (Fig. 5). The block 66 is reciprocated on the rod 90 by means of a connecting rod 94 (Fig. 3) that is operated by a crank disk 96 on a shaft 98. The shaft 98 is driven through miter gears 100, one of which is secured on the shaft that carries the upper heating roll 50.

By varying the pivotal connection between the connecting rod 94 and the crank disk 96 with relation to the axis of the disk, the stroke of the traverse guide may be varied as desired.

During the winding of the paper wrapping about the periphery of the roll, the candies are held in position by means of fingers 102 which engage the endmost candies preliminary to the retraction of the conveying devices 34. These fingers are retracted previously to the tucking in of the ends of the wrapper by means of the tucking devices 36. These fingers may be arranged and operated as described in Townsend Patent No. 1,796,773. In Fig. 8 of the drawings, one of these fingers is shown as being movable into and out of engagement with the candies through a lever 104 that engages in a cam groove 106 on a cam 107 carried by a shaft 108.

In accordance with the present invention, surrounding one of the fingers 102 there is a sleeve 110 that is carried by a rod 112 mounted to slide in an aperture in the machine frame (Figs. 7 and 8). This rod is adapted to be moved in opposite directions to carry the sleeve 110 therewith through a lever 114 that is held in operative engagement with a cam surface 115 on the cam 106 by means of a coiled spring 116.

A space is provided between the inner wall of the sleeve 110 and the associated finger 102 which is in communication through a flexible tube 118 with a pipe 120 that is connected with a suction pipe 122. When the paper wrappings have been wound approximately once around the candies, the suction sleeve 110 is moved inwardly in close proximity to the projecting edge of the wrapper and is then slowly retracted therefrom so as to draw the projecting end of the tearing ribbon outwardly and hold it in position during the tucking in of the ends of the wrapper, thus insuring that when the paper has been completely wrapped about the roll of candies the end of the wrapper will project outwardly from one of the tucks.

Similar suction means is provided in association with the wrapping mechanism for wrapping the foil about the paper wrapper. The suction sleeve and mechanism for operating the same is the same for both the paper wrapping mechanism and the foil wrapping mechanism and consequently but one such mechanism is illustrated.

When a package and tearing ribbon are not in position to be operated upon by the suction means, the suction may be shut off by closing a valve 119 in the pipe 120. The valve is opened and closed by means of a cam surface 121 on the cam 107 which engages a pivoted shoe 123 connected with the valve stem, the shoe being held in contact with the cam by a spring 125 coiled about the stem.

The cutting knives 24 for cutting off the excess ribbon is associated with the foil wrapping mechanism 35. One of the cutting knives 24 comprises a cutting block 124 which is carried by the lower wrapping roll 28 (Fig. 7). The other cutting knife comprises a bar 126 that is mounted to slide on the end of the feed roll, the bar 126 being guided by members 128 which extend through an elongated slot 130 in the bar.

At the completion of the tucking in of the ends of the wrapper the cutting knives 24 are positioned at opposite sides of the end of the tearing ribbon by the rotation of the lower wrapping roll, and during the continued rotation of the wrapping roll, a roll 132 on the outer end of the bar 126 is brought into engagement with a stationary cam surface 134 on a fixed bracket member 136 on the machine frame. As the roll 132 rides on the cam surface 134 the bar 128 is operated so as to cooperate with the cutting block 124 to cut off the end of the tearing strip. During the continued rotation of the lower wrapping roll the cam roll 132 is brought into engagement with a cam surface on a bracket member 138 which moves the cutting bar 126 to its open position ready for the next package to be operated upon.

The portion of the ribbon that is cut off is drawn through the suction sleeve 110 and hose 118 of the suction means, so as to be removed from the machine.

As will be evident to those skilled in the art, my invention permits various modifications without departing from the spirit thereof or the scope of the appended claims.

What I claim is:

1. In a machine for wrapping articles of the class described, devices adapted to wrap an article when the article and wrapper are presented thereto, means for feeding a strip of wrapping material to said devices, and means for applying a tearing strip to one side of said material as it is being fed, the improvement which consists in said last-mentioned means applying the tearing strip in a sinuous path made up of oppositely directed bends alternately arranged and with portions of corresponding bends extending beyond one of the longitudinal edges of the wrapping material, means for cutting off lengths of the end portions of the wrapping material and the tearing strip, and means for presenting said lengths with the article to the wrapping devices, the cutting off operation severing each of said projecting bend portions of the tearing strip.

2. Means for forming wrappers comprising devices for feeding a strip of wrapping material longitudinally, means for applying a tearing strip to one side of said material in a sinuous path made up of oppositely directed bends alternately arranged with portions of corresponding bends projecting beyond one of the longitudinal edges of the wrapping material, and means for cutting off lengths of the end portions of the wrapping material and tearing strip, the cutting off operations severing each of said projecting bent portions of the tearing strip.

3. Means for forming wrappers comprising devices for feeding a strip of wrapping material and a tearing strip longitudinally, means for guiding the tearing strip as it is being fed to cause it to be laid in a sinuous path on one side of the wrapping material, said sinuous path being made up of oppositely directed bends alternately arranged with portions of corresponding bends projecting beyond one of the longitudinal edges of the wrapping material, means for applying adhesive to the tearing strip previously to its coming in contact with the wrapping material so as to cause the tearing strip to adhere to the wrapping material, means for cutting off lengths of the end portions of the wrapping material and tearing strip, the cutting off operations severing each of said projecting bent portions of the tearing strip.

4. Means for forming wrappers comprising devices for feeding a strip of waxed paper and a strip of unwaxed paper longitudinally, means for laying a tearing strip between the two strips of paper as they are being fed, and for bringing the two paper strips together, the last mentioned means being provided with means for causing the tearing strip to be laid in a sinuous path made up of oppositely directed bends alternately arranged, the portions of corresponding bends projecting beyond one of the longitudinal edges of the waxed paper strip, means for applying heat to the composite strip thus formed so as to melt the wax of the waxed paper to cause the two papers to be secured together with the tearing strip between them, and means for cutting off lengths of the end portion of the composite strip, the cutting off operations severing each of said projecting bent portions of the tearing strip.

5. In a machine for wrapping cylindrical articles of the class described, means for applying a tearing strip to one side of a strip of wrapping material with at least one end of the strip projecting from one of the longitudinal edges of the material, means for winding the material about the article with the tearing strip on the inside, means for tucking in the ends of the wrapping material over the ends of the article, and means for maintaining the projecting end of the tearing strip directed outwardly during the tucking in of the ends of the wrapping material so that when the ends of the wrapping material have been tucked in the tearing strip will project out from beneath one of the tucks of one of the tucked in ends of the wrapping material.

6. A structure according to claim 5 in which there is provided means acting automatically to cut off a portion of the projecting end of the tearing strip at the completion of the wrapping operation.

7. Means for forming wrappers comprising means for applying a tearing strip to one side of a strip of wrapping material with a bent portion of the strip projecting beyond one of the longitudinal edges of the wrapping material, and means for cutting off a length of said wrapping material and tearing strip, the severing of the tearing strip taking place through said projecting bent portion thereof.

8. Means for forming wrappers comprising devices for feeding a strip of wrapping material and a tearing strip longitudinally, a guiding device for the tearing strip for laying the tearing strip on one side of the wrapping material, means for relatively traversing the tearing strip and wrapping material in opposite directions transversely thereof while they are being fed so as to cause the tearing strip to be laid in a sinuous path made up of oppositely directed bends alternately arranged with portions of corresponding bends projecting beyond one of the longitudinal edges of the wrapping material, and means for cutting off lengths of the end portions of said wrapping material and tearing strip, the severing of the tearing strip taking place through said projecting bent portions thereof.

WILLIAM T. MARTIN.